Sept. 27, 1927.
H. HARGREAVES
AUTOMOBILE BRAKE
Filed May 7, 1927
1,643,890
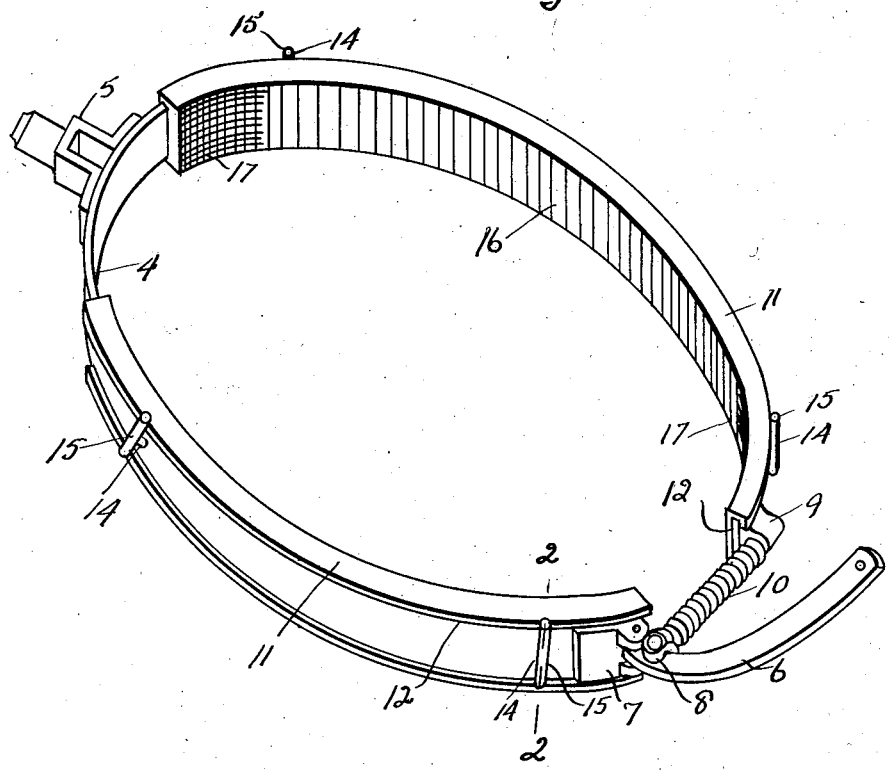
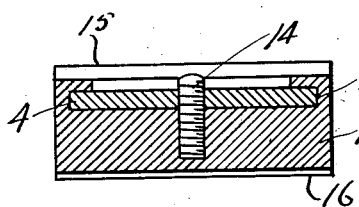
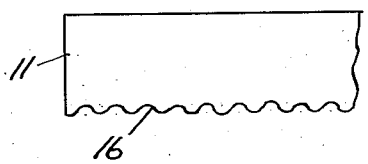
INVENTOR
Herbert Hargreaves
By W. W. Williamson, Atty.

Patented Sept. 27, 1927.

1,643,890

UNITED STATES PATENT OFFICE.

HERBERT HARGREAVES, OF PHILADELPHIA, PENNSYLVANIA.

AUTOMOBILE BRAKE.

Application filed May 7, 1927. Serial No. 189,499.

My invention relates to new and useful improvements in an automobile brake, and has for its primary object to provide an exceedingly simple and effective device of this character including detachable shoes produced from a special tough metal and provided with transverse friction grooves intermediate its ends; and further provided with longitudinal grooves in the region of said ends whereby a firm grip upon a brake drum is obtained when the brake is applied.

A further object of the invention is to provide a brake which may be made in different styles, and the shoes readily removed and replaced when necessary to make repairs or for renewing the shoes.

A further object of the invention is to provide a unique method of holding the shoes on the brake band.

By constructing the brake shoes from tough metal they will give long service without injury to the brake drum and a peculiar gripping surface in the form of friction grooves provides for firmly holding the brake drums which from actual experience greatly assists in causing the automobile to overcome obstacles, such as pulling out of mud holes.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is a perspective view of an automobile brake constructed in accordance with my invention.

Fig. 2, is an enlarged sectional view on the line 2—2 of Fig. 1.

Fig. 3, is an enlarged fragmentary edge view of one of the brake shoes.

In carrying out my invention as herein embodied, 4 represents the usual brake band or supporting structure in the form of a ring split at one point to provide separated ends. The brake band is provided with a hanger 5 at a point substantially diametrically opposite the separate ends for properly supporting the brake relative to its drum on an automobile. The separated ends are moved relative to each other by actuating mechanism including a lever 6 having one end pivoted between the ears of a lug 7 with a rod 8 pivoted to said lever intermediate its ends and slidably mounted in a lug 9 with a spring 10 coiled about the rod to move the ends of the band in the direction opposite to the movement caused by operation of the lever 6.

While I have so far described a contracting brake band, it will be obvious that the invention can be used in connection with an expanding brake band by merely reversing the parts.

On the brake band or supporting structure 4 are slidably mounted a pair of arcuate shoes 11 provided with channels 12 by which they may be slid endwise on to the brake band over the ends of the latter, and when properly positioned, said shoes are held in place by set screws 14 threaded through the brake band and into the body of said shoes. Said set screws are provided with finger pieces or handles 15 by which they may be normally screwed into place, and I prefer that said finger pieces lie across the flanges of the shoes and engage therewith when completely set up.

The inner or working surfaces of the shoes are corrugated or ground, as indicated at 16, and said grooves or corrugations run transversely of the shoes intermediate their ends while in the region of said ends, the working surfaces of the shoes are further corrugated or grooved longitudinally as shown at 17. These grooves or corrugations provide a friction gripping surface that works upon a brake drum, and when the brake is actuated, the grip will be so firm that slipping is absolutely prevented.

Of course I do not wish to be limited to the exact details of construction as herein shown as these may be varied within the limits of the appended claims without departing from the spirit of my invention.

Having thus fully described my invention, what I claim as new and useful is:

1. A brake shoe, comprising in combination, a brake band, brake shoes slidably mounted thereon and having transverse corrugations throughout the working surfaces thereof, and further provided with longitudinal corrugations only in the region of the ends of said shoes, and means to fasten the shoes to the brake band.

2. In a brake, a detachable shoe having a transversely corrugated working surface between two portions which are transversely and longitudinally corrugated.

In testimony whereof, I have hereunto affixed my signature.

HERBERT HARGREAVES.